United States Patent
Breitenbeck et al.

(10) Patent No.: US 6,548,659 B1
(45) Date of Patent: Apr. 15, 2003

(54) PROCESS FOR AMMONIATING CELLULOSIC MATERIALS

(75) Inventors: Gary Breitenbeck, Baton Rouge, LA (US); Keith Kember, White Castle, LA (US)

(73) Assignee: The Board of Supervisors of Louisiana State University & Agricultural & Mechanical College, Baton Rouge, LA (US)

( * ) Notice: Subject to any disclaimer, the term of this patent is extended or adjusted under 35 U.S.C. 154(b) by 0 days.

(21) Appl. No.: 09/823,206

(22) Filed: Mar. 30, 2001

Related U.S. Application Data

(60) Provisional application No. 60/265,713, filed on Jan. 31, 2001.

(51) Int. Cl.⁷ .............................. C08B 1/00; A23K 1/22; A23K 1/00; D01C 1/00
(52) U.S. Cl. ............................ 536/30; 536/56; 426/69; 426/635; 426/807; 162/91; 162/96
(58) Field of Search ......................... 426/69, 635, 807; 536/18.7, 30, 55, 55.1, 55.3, 56, 123.1; 162/91, 96

(56) References Cited

U.S. PATENT DOCUMENTS

| | | | | |
|---|---|---|---|---|
| 4,321,278 A | * | 3/1982 | Johanning et al. | 426/69 |
| 4,517,329 A | * | 5/1985 | Mottus | 524/401 |
| 4,595,396 A | * | 6/1986 | Erdman | 44/63 |
| 4,600,590 A | * | 7/1986 | Dale | 426/69 |
| 5,037,663 A | * | 8/1991 | Dale | 426/69 |
| 5,171,592 A | * | 12/1992 | Holtzapple et al. | 426/69 |

OTHER PUBLICATIONS

De Silva et al. J. Environ. Qual. 1997, vol. 26, 688–694.*
Scholl et al. "Ammoniation of Peat for Fertilizers" Industrial and Engineering Chemistry, Oct. 1933, 25 (10), 1074–1078.*

* cited by examiner

Primary Examiner—James O. Wilson
Assistant Examiner—Josephine Young
(74) Attorney, Agent, or Firm—Jones, Walker, Waechter, Poitevent, Carrere & Denegre, L.L.P.

(57) ABSTRACT

Process for enriching the organic nitrogen content of commercial scale quantities of cellulosic materials which includes the steps of: a) placing substantially dry or unwetted cellulosic material in a pressurizable reactor; b) injecting an ammonia or ammonia-forming nitrogen solution into the reactor until the cellulosic material is approximately submerged; c) setting the temperature in the reactor to maintain a liquid temperature between about 80 and 200° C.; d) pressurizing the reactor to at least 750 psi; e) maintaining the temperature and pressure in the reactor for a period of time sufficient for the organically bound nitrogen content of the cellulosic material to exceed about 1.5%; and f) drying the cellulosic material to a moisture content sufficiently low to arrest microbial activity.

16 Claims, 3 Drawing Sheets

PROCESS FOR AMMONIATING CELLULOSIC MATERIALS

This utility patent application claims benefit of provisional patent application No. 60/265,713, filed on Jan. 31, 2001.

BACKGROUND OF THE INVENTION

The present invention relates to methods of cleaning up oil spills using nitrogen enriched cellulosic material. In particular, the present invention relates to an improved process for nitrogen enrichment of cellulosic materials.

There are a number of ways to clean up large-scale spills of oil into the environment. Oil spills on open water bodies are typically recovered by absorbing booms and skimmer devices or sometimes simply by burning the oil in place. However, such methods are either not effective or too destructive when the oil spill is in a heavily vegetated area such as marshlands or other wetlands. One known method of cleaning up oil spills in wetlands is through the introduction of oil degrading microorganisms. Unfortunately, crude oil tends to flocculate together excluding water and water-soluble nutrients; thereby offering limited surface area for microorganisms to attack. To alleviate this problem, it is known to employ cellulosic materials to absorb spilled oil and thus expose a much greater surface area of oil to microbial remediation. Useful cellulosic materials include the husk or other waste byproducts generated in processing rice, sugarcane, cotton, timber and the like. "Bagasse" or the sugarcane rind that remains after milling is a particularly favorable cellulosic material.

By increasing the nitrogen (and other nutrients) content of cellulosic materials, they become much more effective in promoting oil decomposition by providing an environment which contains all the essential requirements for rapid microbial degradation of oil. A method of increasing the nitrogen content of cellulosic materials is disclosed in "Nitrogen Enrichment of Organic Wastes by Ammoniation", J. Envrion. Qual., Vol. 26, May–June 1997 (Breitenbeck and DeSilva). This article discloses placing dry cellulosic material in a bench scale reactor (with a volume of less than 2 liters) with ammonia ($NH_3$) and then increasing the pressure to greater than 950 psi while increasing the temperature to about 80 to 120° C. When used in bench scale reactors (volumes from a few liters to a few gallons), this method of ammoniating bagasse increased the nitrogen content of bagasse from its untreated level of about 0.5% N (on a dry weight basis) to about 2.75% N or higher. It is believed that no significant enhancement of microbial activity is produce by enriching the cellulosic material above about 2.8% N.

While the above process worked well in bench-scale experiments, serious difficulties were encountered when this process was scaled up to a full size reactor (e.g. 10 ft³ or larger) capable of producing commercial quantities of ammoniated bagasse. There was a tendency for the pressure to increase uncontrollably and in some instances, resulted in a violent explosion in the reactor vessel. It is believed that when large quantities of dried cellulosic fiber material were exposed to elevated temperature and pressure, accumulation of heat from exothermic reactions concentrated on the uppermost surface of the organic fiber. When left unattended, temperatures would exceed the ignition temperature of the organic fibers (220–250° C.) and once ignited, cause a marked increase in pressure. If pressure was not reduced by relief values, pressure and temperature will exceed those required for the ignition of the ammonia-air atmosphere resulting in an internal explosion and violent release of gas from relief valves and possibly damage to the reactor vessel and surrounding area. What is needed in the art and is provided by this invention is a method of ammoniating commercially viable quantities of cellulosic materials in a safe, controlled process.

SUMMARY OF INVENTION

One embodiment of the present invention provides a process for ammoniating cellulosic materials. The process includes the steps of: a) providing a cellulosic material; b) moistening the cellulosic material to approximately 50% to 100% of its saturated moisture content; c) placing the cellulosic material in a reactor vessel; d) pressurizing the reactor to a pressure of less than about 200 psi; e) injecting into the reactor an amount of an ammonia or ammonia-forming nitrogen equal to, about 2% to 8% of the dry weight of the cellulosic material; f) allowing an exothermic reaction to occur until the temperature of the cellulosic material stabilizes; g) increasing pressure in the reactor vessel to at least about 700 psi while maintaining a temperature in the reactor vessel under about 200° C. for a period of time sufficient for the organically bound nitrogen content of the cellulosic material to exceed about 1.5% N on a dry weight basis; and h) drying the cellulosic material to a moisture content sufficiently low to arrest microbial activity.

Another embodiment of the present invention provides another process for ammoniating a cellulosic materials. The process includes the steps of: a) placing substantially dry or unwetted cellulosic material in a pressurizable reactor; b) injecting an ammonia or ammonia-forming nitrogen solution into the reactor until the cellulosic material is approximately submerged; c) setting the temperature in the reactor to maintain a liquid temperature between about 80 and 200° C.; d) pressurizing the reactor to at least 750 psi e) maintaining the temperature and pressure in the reactor for a period of time sufficient for the organically bound nitrogen content of the cellulosic material to exceed about 1.5%; and f) drying the cellulosic material to a moisture content sufficiently low to arrest microbial activity.

DETAILED DESCRIPTION OF THE INVENTION

Figure 1:
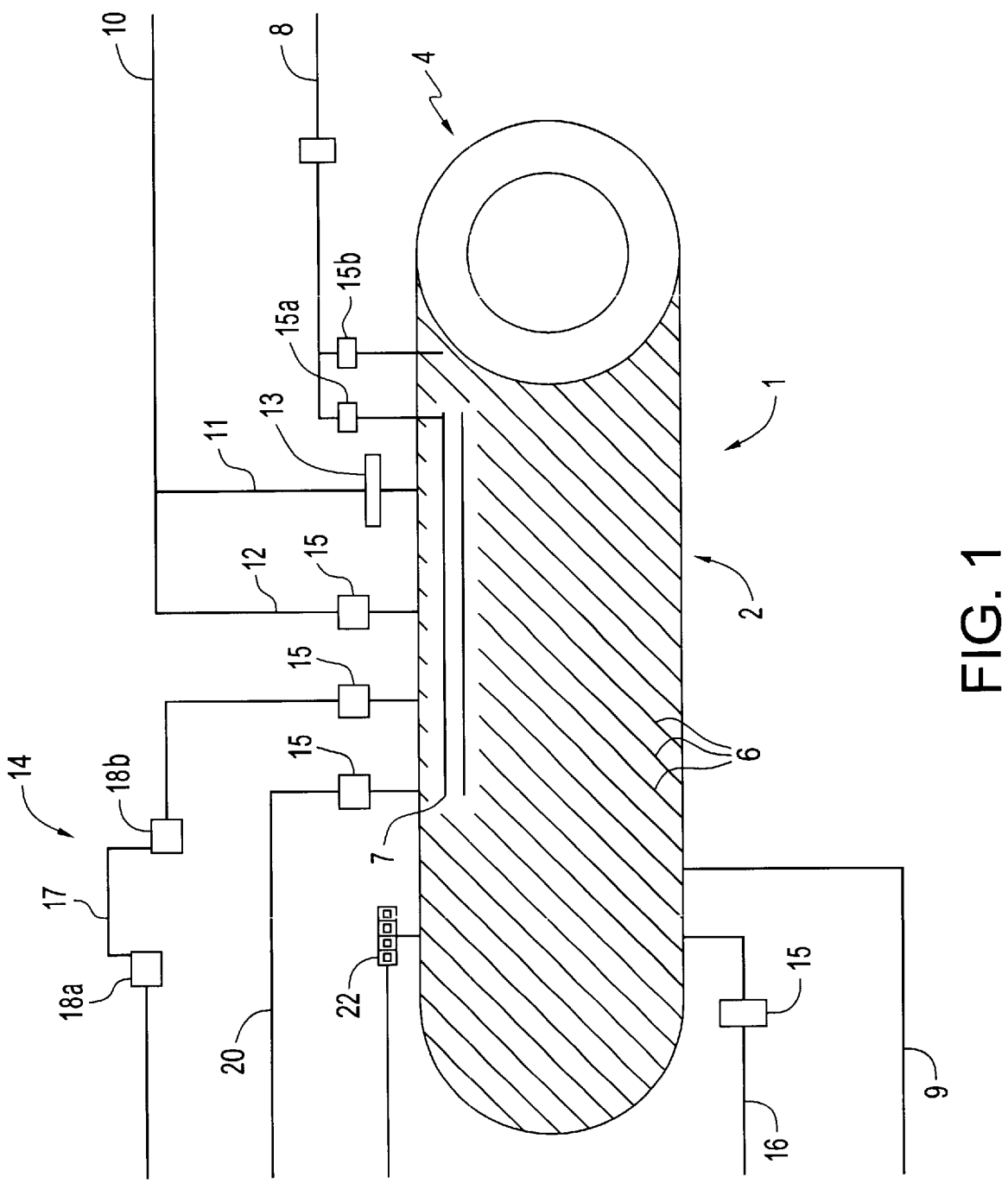
FIG. 1, is a schematic side view of a reactor vessel for carrying out one embodiment of the present invention.

FIG. 1 illustrates a reactor which is used in one method of the present invention for ammoniating bagasse. Reactor vessel 1 generally comprises body 2 with a door 4 closing an open end of the reactor. In one embodiment, body 2 was formed of 24" steel pipe. Door 4 could be any conventional reopenable closure for high-pressure vessels. In a preferred embodiment, door 4 will be rated to withstand a pressure of 5000 psi. Vessel 1 will have an external heating mechanism on its outside surface. In FIG. 1, this external heating mechanism is a steam radiator comprising a continuous coil of ½" copper tubing 6 wrapping around body 2. The exterior wall may also have insulation placed over copper tubing 6. Vessel 1 further has an interior heating element which in FIG. 1 comprises steam radiator 7. Radiator 7 may be formed from a series of parallel ½" black iron pipes. A steam feed line 8 will provide higher temperature steam to both radiator 7 and the tubing 6 around body 2. Separate control valves 15a and 15b will regulate the amount of steam entering radiator 7 the and tubing 6 respectively and thereby separately control the temperatures of these heating elements. The steam exiting radiator 7 and tubing 6 may be collected at a common steam return line 9 for eventual reheating and recirculation. Vessel 1 is illustrated with numerous other lines communicating with the interior of body 2. Operating exhaust line 12 will feed into common exhaust line 10. Exhaust line 12 will have a control valve 15 and will be used to vent pressure from vessel 1 during normal operation as part of the process described below. There will also be an emergency exhaust line 11 feeding into common exhaust line 10. Exhaust line 11 will have an emergency relief mechanism such as conventional rupture disk 13. In the embodiment shown, rupture disk 13 is designed to fail and allow pressure to be released through line 11 if the pressure in Vessel 1 exceeds 1500 psi. Line 20 will supply compressed air while line 16 will form a wastewater collector line for use as described below. In order to introduce measured amounts of ammonia into vessel 1, a measuring device 14 will be positioned in a line between an ammonia source (not shown) and vessel 1. In the embodiment shown, metering device 14 is a syringe 17. The valve 18a is open to allow high-pressure ammonia to fill the known volume of syringe 17. Valve 18a is then closed and valve 18b opened to allow that volume of ammonia to flow into vessel 1. This process will be repeated until the total weight of ammonia desired is injected into vessel 1 Naturally, the pressure at the ammonia source, the pressure in vessel 1, and the temperature of the ammonia in syringe 17 all effect the amount of ammonia delivered upon each operation of syringe 17. However, persons of ordinary skill in the art may be easily determine empirically the amount of ammonia delivered under different pressures and temperature. Element 22 represents connection points for an array of pressure transducers and thermocouples positioned within vessel 1 and utilized to continuously monitor the pressure and temperature therein.

Figure 2:
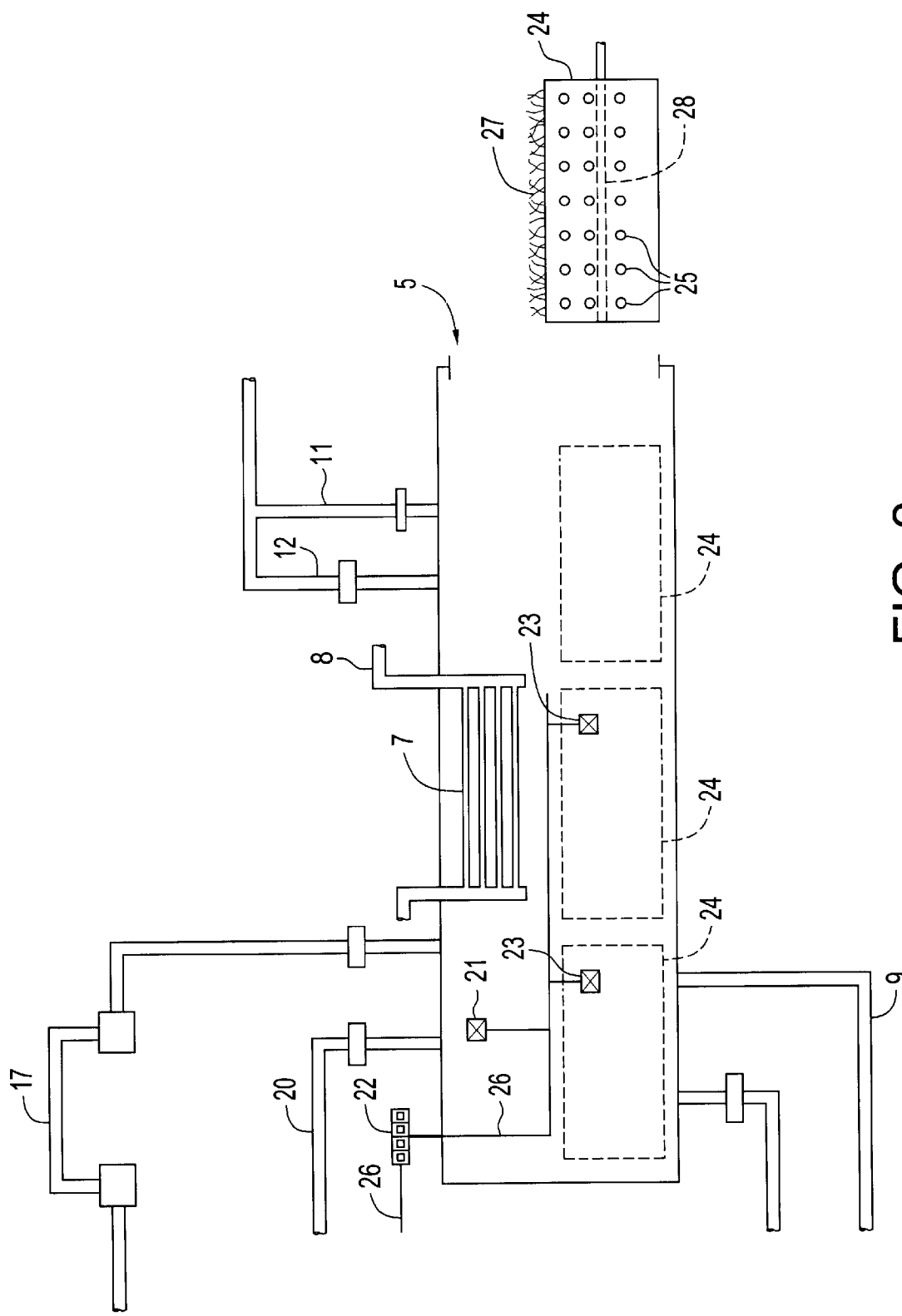
FIG. 2 is a side cross-sectional view of the reactor vessel seen in FIG. 1.

FIG. 2 is a cutaway side view of vessel 1 and illustrates the means for positioning the bagasse inside vessel 1. The Invention utilizes carousels 24 which are in the shape of half cylinder baskets and are approximately 1" less in diameter than the interior of vessel 1. Carousels 24 are constructed of perforated stainless steel. The perforations 25 are size to allow the free flow ammonia through the cellulosic material without the material easily working through the perforations. FIG. 2 suggests how carousels 24 will be filled to their top edge with cellulosic material 27. One embodiment of carousel 24 will include an ammonia injection tube 28 positioned in the center of carousel 24. Injection tube 28 will be perforated along its length and will connect to the line leading from ammonia syringe 17. Injection tube 28 will help insure that ammonia is evenly dispersed throughout the cellulosic material in carousel 24. FIG. 2 suggests how numerous carousels 24 may be inserted through pressure doorway 5 and positioned sequentially in vessel 1. It will be understood that conventional connecting methods may be employed to have the injection tubing of adjacent carousels interconnected. FIG. 2 also suggests the preferred positioning of thermocouples 23. Just prior to loading carousels 24 into vessel 1, thermocouples 23 (typically on rigid rods) will be positioned about 2" below the level of the cellulosic material. It is believed that this is the approximate depth where maximum heat in the bagasse is generated. Thermocouples 23 may communicate with connection point 22 by way of conventional wiring 26. Pressure transducers 21 will also be positioned in vessel 1 and communicate with connection point 22.

The vessel of FIGS. 1 and 2 is used to carry out one preferred process for ammoniating cellulosic materials. In this process, the cellulosic material (e.g. bagasse) is first moistened with hot water to near saturation (about 4 g $H_2O$/g dry bagasse). The moistened bagasse is then loaded into vessel 1 which has been preheated to about 100° C. by steam coils 6. Next, vessel 1 is pressurized to about 60 to 75 psi and an appropriate amount of ammonia introduced using an ammonia syringe. Preferably, the amount of ammonia injected will be equal to about 2% to 8% of the dryweight of the bagasse in vessel 1. Most preferably, the amount of ammonia will be about 4% of the dry weight of the bagasse. While ammonia is a preferred source of nitrogen, those skilled in the art will recognize other nitrogen-based compounds (such as ammonium hydroxide) could be used in the present invention. It is only necessary that these compounds be capable of imparting sufficient nitrogen (either by forming ammonia in the vessel or by other chemical reactions) to the bagasse. Initially, the temperature of the bagasse will begin to rise due to exothermic reactions. As mentioned above, the temperature increase will be monitored with thermocouples 23 placed approximately two inches below the uppermost surface of the bagasse. Once the temperature within the bagasse has decreased 2° C. from its maximum produced in the exothermic reaction (typically after about 60 minutes), vessel 1 is then pressurized to 1000 psi with compressed air from line 20. Radiator 7 then controls the temperature of vessel 1 to maintain the bagasse at a temperature of 100–110° C. for a time period sufficient for the organically bound nitrogen content of the cellulosic material to exceed about 1.5% N on a dry weight basis. Preferably, the time period will be sufficient for the organically bound nitrogen content to exceed about 2.75% N. This time period has been found to be about 90 minutes after pressurization to 1000 psi. Thereafter, vessel 1 is depressurized though exhaust line 12. In a preferred embodiment, vessel 1 is fitted with low and high-pressure tranducers. When interior pressures are less than 100 psi, the low-pressure transducer provides the pressure reading. When pressures exceed 100 psi, the low-pressure transducer is isolated by toggling an automatic valve (typically computer controlled), and the signal from the high-pressure transducer is then monitored. The use of a sensitive, low-pressure transducer insures that the reactor is completely depressurized before attempting to open the doors upon completion of the process. After initial depressurization, pressurized air from line 20 is used to further flush vessel 1 several times with air to insure no significant amounts of ammonia are remaining in vessel 1. Common exhaust line 10 will be fitted with a muffler and scrubber to lessen the noise of exhausting gas and to insure no harmful concentration of ammonia is released to the atmosphere. A small quantity of liquor consisting of soluble organic matter and ammonia hydroxide is released during the reaction. After the completion of the process, this liquor is forced from the reactor (using air pressure) and into wastewater collector line 16 at the bottom of the reactor. The liquor may be collected and reused in wetting bagasse feedstock in subsequent runs of the process.

After vessel 1 has been depressurized and flushed, the ammoniated bagasse is removed from vessel 1 for final drying. Various conventional means of drying the bagasse may be employed. One preferred method of drying the bagasse is with a conventional agricultural grain dryer. The bagasse is dried to a moisture content on a dry weight basis (grams $H_2O$ per gram of dry material) of less than about 14%. This lower range moisture content tends to arrest any microbial activity that might take place at higher moisture contents. It is desirable to arrest microbial activity until the bagasse is placed in use at the oil-contaminated location.

This process reliably produced bagasse having a nitrogen content of at least 2.75% on a dry weight basis. It is believed that the initial step of maintaining the reactor at 100 psi allows for exothermic reactions to occur more slowly than they occur when the reactor is rapidly pressurized to higher pressures as in prior art processes. The slower reaction rate and allowing time for heat to diffuse within the bagasse prevents the surface from reaching ignition temperatures. Pressures of 180 to 200 psi appear to be the maximum for this initial period to avoid an uncontrolled reaction. Maintaining an initial pressure of 100 psi provides a margin of safety. This method has several advantages. It appears to be robust and consistently results in the production of satisfactory product. Further, the final product is considerably drier than the initial saturated bagasse and therefore requires less drying before final processing and bagging. The principal disadvantages are that the initial bagasse is saturated and awkward to handle when loading reactors and the initial reaction time adds at least about 60 minutes to total processing time.

Figure 3:
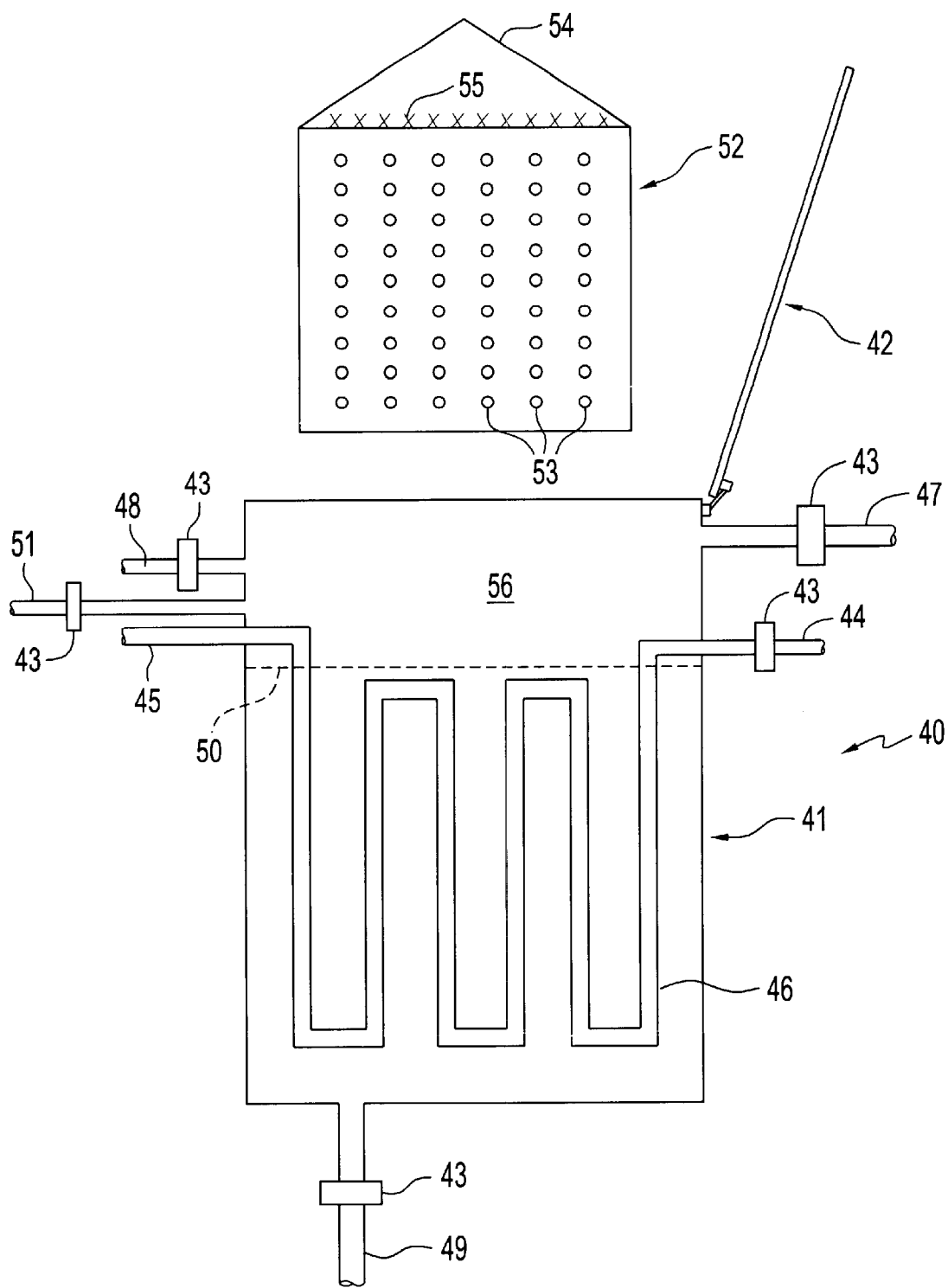
FIG. 3 is a cross-sectional view of a reactor vessel for carrying out a second embodiment of the present invention.

FIG. 3 illustrates a reactor vessel 40 for use with an alternate method of the present invention. Vessel 40 will include an upright, cylindrical hollow body 41 and a conventional high-pressure closure or door 42 positioned at the top of body 41. Vessel 40 will further include a high-pressure air inlet 48, a pressure relief line 51, a liquid inlet line 47, and a wastewater collection line 49. All of these lines will have control valves 43. A steam radiator 46 is positioned within vessel 40 and will have a steam inlet 44 and steam outlet 45. While not precisely shown in FIG. 3, it will be understood that radiator 46 is positioned around and adjacent to the interior perimeter of vessel 40. Normally radiator 46 will be positioned below an expected liquid level 50 in vessel 40 and the remaining interior space in vessel 40 will comprise headspace 56. A basket 52 will hold the bagasse 53 and will be sized to fit within vessel 40 and radiator 46. Like carousels 24 described above, basket 52 will be made of stainless steel with numerous perforations 53 to allow liquid to completely inundate the bagasse in basket 52. A wire, chain, or other suspension means 54 will be connected to basket 52 and allow it to be raised and lowered into vessel 40.

The method utilized in conjunction with vessel 40 begins with placing substantially dry bagasse in basket 52, lowering basket 52 into vessel 40 and securing high pressure door 42 so that vessel 40 may be pressurized. The bagasse is "dry" in the sense that it has the ambient moisture content of its surroundings and has not been purposefully wetted. Ammonia or an ammonia-forming nitrogen solution is then introduced through liquid inlet 47 in a volume sufficient to completely submerge the bagasse in basket 52. In a preferred embodiment, a 0.5 to 5.0 M $NH_4OH$ solution heated to approximately 100° C. is used to submerge the bagasse: The pressure in head space 56 is then increased to approximately 1000 psi. Radiator 46 is controlled to maintain the liquid temperature at about 100–110° C. The bagasse is subject to this temperature and pressure for a period of about 90 minutes. Thereafter, the pressure is reduced to about 150 psi and this remaining pressure is used to eject the solution via wastewater collection line 49 into a collection vessel (not shown). This allows the spent $NH_4OH$ solution to be reused in subsequent reactions after its concentration is adjusted back to the desired molarity by injection of anhydrous ammonia.

Once vessel 40 is fully depressurized, the reactor is flushed several time with air and the ammoniated bagasse removed for final drying to a moisture content of less, than about 14%. The wet bagasse may be placed directly in a conventional grain dryer. However, because the bagasse is saturated, it may be preferable to first centrifuge the bagasse to remove a significant part of the liquid, and then continue the drying process in the grain dryer.

In addition to achieving high levels of N enrichment, the method described in relation to FIG. 3 has several advantages over the method described in relation to FIGS. 1 and 2. First, this latter method is robust and by submerging the bagasse, completely eliminates potential for combustion. Second, a greater part of the waste is captured and reused. Third, the latter method is more rapid than the first because it is not necessary to allow exothermic reactions to peak and subside. Finally, it is easier to handle the bagasse at the front end of the process because it is dry when being placed in vessel 40. However, the principal disadvantages of this process are that the final, product is wet and awkward to handle at the back end of the process. The wet bagasse also requires more drying time and energy.

While the present invention has been described in terms of specific embodiments, those skilled in the art will recognize many variations which fall under the basic invention described above. For example, while the ammoniation of bagasse is described, there are many alternative cellulosic materials which could be used in practicing the invention. As another example, while steam radiators were disclosed as the means for adjusting the temperature in the processes, many other conventional heating devices could also be employed. Additionally, it will be understood that the chemical reactions in the processes described could not take place in a completely anoxic environment. However, the oxygen in the ambient air used to pressurize the reactors contains more than sufficient oxygen to complete the reactions. Furthermore, the processes may easily be automated by a computer controlling valves 15 and 43. The computer language Delphi is a suitable language for writing a program to monitor and control the reactor vessels and processes disclosed herein. Such program offers considerable flexibility in the operation of the reactor and is capable of altering the process based on pressure and temperature data. It may incorporate a number of safety features that can detect the onset of uncontrolled reactions and other problems and will automatically exhaust a pressurized reactor if conditions exceed normal operating parameters. The program would control the process through the stages of ammonia injection, pressurization, interior heating, cooking and exhaust. During operation, the process status as well as pressure and temperatures and their rates of change would be displayed on a monitor screen. Audible warnings would occur if conditions are suspect and the operator would be able to manually override all program controls. Once the process is complete, the program would send any waste liquor in the reactor to a collection vessel and would flush the interior with air until ammonia fumes are not detectable. A report detailing run parameters and temperature and pressure during the various stages of the process would be printed or stored in a database for future reference. All such variations and modifications to the basic invention are intended to come within the scope of the following claims.

We claim:

1. A process for nitrogen enriching a cellulosic material comprising the steps of:
   a) providing a cellulosic material;
   b) moistening the cellulosic material to over approximately 50% of its saturated moisture content;
   c) placing said cellulosic material in a reactor vessel;
   d) pressurizing said reactor to a pressure of less than about 200 psi;
   e) injecting into said reactor an amount of a nitrogen based compound equal to about 2% to 8% of the dry weight of said cellulosic material;
   f) allowing an exothermic reaction to occur until the temperature of said cellulosic material stabilizes;
   g) increasing pressure in said reactor vessel to at least about 700 psi while maintaining a temperature in said reactor vessel under about 200° C. for a period of time sufficient for the organically bound nitrogen content of said cellulosic material to exceed about 1.5% N on a dry weight basis; and
   h) drying said cellulosic material to a moisture content sufficiently low to arrest microbial activity.

2. The process according to claim 1, wherein said cellulosic material provided is bagasse having a total nitrogen content of about 0.5%.

3. The process according to claim 1, wherein said moisture content of said cellulosic material equivalent to about 4 grams of water for each grams of dry cellulosic material.

4. The process according to claim 1, wherein said reactor vessel is pre-heated to about 100° C.

5. The process according to claim 1, wherein said step of allowing said exothermic reaction is continued until said cellulosic material is approximately 2° C. below a maximum temperature obtained during said exothermic reaction.

6. The process according to claim 1, wherein said reactor vessel is pressurized to at least 750 psi.

7. The process according to claim 6, wherein the reactor vessel is pressurized to about 1000 psi.

8. The process according to claim 7, wherein the reactor vessel is maintained at a temperature of between about 100° C. and about 110° C. for about 90 minutes.

9. The process according to claim 1, wherein the amount of nitrogen based compound injected is equal to at least about 4% of the dry weight of said cellulosic material.

10. The process according to claim 1, wherein the ammonia or ammonia-forming nitrogen includes ammonia or ammonium hydroxide.

11. The process according to claim 1, wherein said cellulosic material is dried to a moisture content of about 12% on a dry weight basis in order to arrest microbial activity.

12. The process according to step 1, wherein step (g) further includes maintaining said pressure and temperature for a period of time sufficient for the organically bound nitrogen content of said cellulosic material to reach at least about 2.75% N on a dry weight basis.

13. A process for nitrogen enriching a cellulosic material comprising the steps of:
   a) placing substantially dry or unwetted cellulosic material in a pressurizable reactor;
   b) providing an ammonium hydroxide solution within said reactor to a level which approximately submerges said cellulosic material;
   c) setting the temperature in said reactor to maintain a liquid temperature between about 80 and 200° C.;
   d) pressurizing the reactor to at least 750 psi;
   e) maintaining said temperature and pressure in said reactor for a period of time sufficient for the organically bound nitrogen content of said cellulosic material to exceed about 1.5%;
   f) drying said cellulosic material to a moisture content sufficiently low to arrest microbial activity.

14. The process according to claim 13, wherein the ammonium hydroxide solution may range from 0.5 to 5.0 M solution.

15. The process according to claim 13, wherein said step of maintaining said temperature and pressure continues for a period of about 90 minutes.

16. A process for nitrogen enriching a cellulosic material comprising the steps of:
   a) placing substantially dry cellulosic material in a pressurizable reactor;
   b) providing an ammonium hydroxide solution within said reactor to a level which approximately submerges said cellulosic material;
   c) setting the temperature in said reactor to maintain a liquid temperature above about 80° C.;
   d) pressurizing said reactor to at least 750 psi; and
   e) maintaining said temperature and pressure in said reactor for a period of time sufficient for the organically bound nitrogen content of said cellulosic material to exceed about 1.5%.

* * * * *